US006685747B1

(12) United States Patent
Burrow et al.

(10) Patent No.: US 6,685,747 B1
(45) Date of Patent: Feb. 3, 2004

(54) MIXTURE OF THP AND CHROME AS TANNING AGENTS

(75) Inventors: Robert Burrow, Auckland (NZ); Daniel Sundah, Auckland (NZ)

(73) Assignee: Rhodia Consumer Specialties Limited, Oldbury (GB)

( * ) Notice: Subject to any disclaimer, the term of this patent is extended or adjusted under 35 U.S.C. 154(b) by 0 days.

(21) Appl. No.: 09/890,491

(22) PCT Filed: Feb. 2, 2000

(86) PCT No.: PCT/EP00/00841

§ 371 (c)(1),
(2), (4) Date: Jan. 10, 2002

(87) PCT Pub. No.: WO00/46409

PCT Pub. Date: Aug. 10, 2000

(30) Foreign Application Priority Data

Feb. 3, 1999 (GB) ............................................. 9902247
Mar. 5, 1999 (GB) ............................................. 9904958

(51) Int. Cl.$^{7}$ .............................. C14C 3/02; C07F 9/54

(52) U.S. Cl. .......................... 8/94.27; 8/94.25; 8/94.26; 8/94.33; 8/94.1 P

(58) Field of Search ............................ 8/94.19 R, 94.2, 8/94.21, 94.24, 94.25, 94.26, 94.27, 94.1 P, 94.33

(56) References Cited

U.S. PATENT DOCUMENTS

| | | | |
|---|---|---|---|
| 3,104,151 A | | 9/1963 | Windus et al. |
| 6,482,483 B1 | * | 11/2002 | Fidoe et al. |

FOREIGN PATENT DOCUMENTS

| | | | |
|---|---|---|---|
| DE | 197 24 468 A | | 12/1997 |
| EP | 0 808 908 A | | 11/1997 |
| GB | 2 287 953 A | | 10/1995 |
| GB | 1 050 289 A | | 12/1996 |
| WO | WO 99/17614 | * | 4/1999 |

* cited by examiner

*Primary Examiner*—Margaret Einsmann
(74) *Attorney, Agent, or Firm*—Frishauf, Holtz, Goodman & Chick, P.C.

(57) ABSTRACT

THP and chrome are synergistic tanning agents. The combination of THP with small amounts of chrome and optionally non-ionic and/or cationic surfactants gives increased area yield and shrink temperature compared with THP, and reduced environmental impact compared with chrome. It is possible to combine degreasing, pre-tan and main tan in a single step.

13 Claims, No Drawings

MIXTURE OF THP AND CHROME AS TANNING AGENTS

This application is a U.S. National Phase Application under 35 USC 371 of International Application PCT/EP00/00841 (published in English) filed Feb. 2, 2000.

The present invention relates to a novel process for tanning leather. Tanning is a process for the preservation of skins, by which is meant the collagen-containing integuments of vertebrates including mammals (e.g. cows, pigs, deer, goats, sheep, seals, antelope, mink, stoats and camels), fish, (e.g. sharks), reptiles (e.g. snakes, lizards and crocodiles), and birds (e.g. ostrich). Skins comprise a layer of collagen, and tanning entails reacting the collagen with a cross linking, or tanning, agent to cross link reactive sites within the collagen molecule. The product of the cross linking is leather, which is substantially less susceptible than untanned skin to bacterial degradation.

A consequence of the cross linking is an increase in the minimum temperature at which the wet leather tends to shrink. This shrink temperature is often used as an indication of the degree of tanning.

The collagen layer of the skin is separated from fats, connective tissue and other subcutaneous protein, and optionally from the outer keratinous layer, by a combination of chemical and physical steps. The former may include liming, bating, pickling and/or degreasing.

The skin is then subjected to treatment in one or more stages with various tanning agents selected to give the desired end properties.

The main types of tannage are: vegetable tannage, based on tannin as the active cross linking agent; mineral tannage using various polyvalent metal salts, especially salts of chromium, aluminium, iron, or zirconium; and synthetic tanning agents, referred to as "syntans". Syntans include replacement syntans which are active tanning agents capable of tanning leather when used as the sole tannage and auxiliary syntans which are added to other tannages to modify the character of the leather but which are not in themselves active tanning agents. Syntans include various polymers and copolymers, such as those obtained by condensing formaldehyde with, for example, phenols and/or aryl sulphonates, and acrylate, methacrylate, acrilamide and/or acrylonitrile homopolymers and copolymers. Formaldehyde itself and dialdehydes such as glutaraldehyde are also used in tanning, usually in combination with other tannages.

For centuries the production of leather was based on the vegetable tannages. One of the first mineral tannages was alum, but currently the most widely used tanning agent is chrome, usually in the form of basic chromium sulphate, which produces a blue grey leather with high shrink temperatures. However mineral tannages in general, and chrome tannages in particular give rise to effluent problems which may require expensive treatment to avoid environmental damage. Syntans are less environmentally harmful than mineral tanning agents but are typically less cost effective. Formaldehyde and difunctional aldehydes present a health hazard and are unpleasant to handle.

Tannages are usually applied to skins at levels of from about 3% to 20% by weight based on the wet weight of the skins. In the case of chrome tans a typical level for a main tan would be 8%. Where chrome is used in combination tannage, e.g. as a retannage to complete the tanning of leather previously treated with a vegetable tannage or syntan, the concentration may be as low as 4% based on the wet weight of skins. Little or no effective tanning is normally expected at concentrations below 3% tannage.

Tetrakis (hydroxymethyl) phosphonium salts which will be referred to generically herein as THP salts have long been used as fire-retardants for textiles and have been applied to the keratinous (fur) side of skins for this purpose. The salts may be applied directly to the fabric or in the form of precondensates which are water soluble or sparingly water soluble condensates of THP with organic nitrogen compounds such as urea or an amine. Such condensates are referred to herein as THP condensates.

THP condensates may contain 2 or more phosphorus atoms, so long as the condensate is water soluble to a concentration of at least 0.5 g/l at 25° C. Such condensates contain a total of at least 2 hydroxymethyl groups, usually at least one per phosphorus atom, and preferably at least 2 hydroxymethyl groups per phosphorus atom. The group or groups joining the phosphorus atoms together may be of the formula —R—, —R—O—, —R—O—R—, —R—NH—R or —R—R"—R— where R is an alkylene group of 1 to 4 carbon atoms and R" is the residue formed by removal of two hydrogen atoms, bonded to nitrogen, from a di or polyamide or an amine or di or polyamine, such as urea, a $C_{1-20}$ alkylamine, dicyandiamide, thiourea, melamine or guanidine. Such condensates with 2 or more, e.g. 3, hydroxyalkyl groups per phosphorus atom may be made by self condensation of THP salts with a compound of general formula $R"H_2$ such as urea, or a $C_{1\ to\ 20}$ alkylamine, e.g. by heating at 40 to 120° C.

U.S. Pat. No. 2,992,879 recommended a combination of THP chloride (THPC) and a phenol such as resorcinol to form an effective tanning agent when the pH is raised. THP salts copolymerise with the phenols. U.S. Pat. No. 3,104,151 describes the use of such THPC phenol copolymers as pretannages for leather in which the main tannage is vegetable or mineral. GB 2 287 953 describes the use of THP salts as cross linkers in conjunction with melamine formaldehyde or urea formaldehyde prepolymers, in order to form a copolymeric tanning agent in situ in the tanning liquor. EP 0 559 867 describes the use of THP sulphate (THPS) on raw or cured skin prior to tanning e.g. in acid degreasing. EP 0 681 030 describes the use of THPS as a cross linker for casein finishes applied to leather after tanning.

THP salts are stable under acidic conditions in the absence of air or oxidising agents. At pH above 3 and in the absence of oxidising agents they are gradually converted to the parent base, tris(hydroxymethyl)phosphine herein referred to as THP. Conversion is rapid and substantially complete between pH of about 4 and 6. Above pH 7, or in the presence of oxidising agents THP salts or THP are converted to tris(hydroxymethyl)phosphine oxide (THPO), conversion being rapid and substantially complete at pH above about 10, e.g. 12, or at lower pH in the presence of atmospheric oxygen.

In our copending application PCT/EP98/06837 we have described the use of THP and THP condensates as highly effective main tanning agents. The THP may be formed in situ by first impregnating the leather with a THP salt, in the substantial absence of monomers or prepolymers which react or copolymerise with THP and raising the pH above 4 and preferably above 5. THP provides an effective tanning system, which is ecologically friendly. We believe that hydroxymethyl phosphine species, other than THP, THPO and THP salts and condensates may be formed in the leather as intermediates during the tanning process when THP or its condensates contact collagen. Where the context permits, references herein to THP should be construed as including references to any such species so formed, or added to the tannage.

A benefit of THP is the tight quality of the leather. Hitherto this desirable characteristic has only been achievable in conjunction with relatively low area yield, that is to say, the total area of usable leather obtained is reduced, as a result of shrinkage. With some mineral tannages area yields are increased relative to the area of the original skin. Area yield is an important economic consideration.

Another characteristic of THP based tannages is that the maximum shrink temperatures that have been achieved, even in combination with syntans, does not match those attainable with mineral tannages. This has limited the use of THP to applications in which hydrothermal stability is not a primary concern.

A particular problem with chrome tannages is the formation of chrome soaps when they react with grease in the skin. These cause unsightly staining of the skins, which staining persists through the processing and carries through to the finished leather. This is a particularly serious problem with the more greasy skins, such as sheepskin. As a consequence the skins must be thoroughly degreased before the first chrome tanning step. A typical tanning sequence involves a number of distinct stages. Skins are usually limed for storage prior to tanning, giving a highly alkaline pH. After deliming, the skins are first pickled with acid to lower the pH and then degreased. Then follows the main tanning stage usually using chrome tan and optionally a retan, usually with syntans or vegetable tannages, to impart particular characteristics to the leather. Finally the oils lost from the skin during the tanning sequence are at least partially replaced (fat liquoring) and the leather may be dyed and/or finished, e.g. with a resin coating. Each of the stages of the above tanning sequence is time consuming, taking from 0.5 to 3 hours.

An object of the invention is to provide a tanning system that combines the desirable qualities of THP tanned leather with improved area yield and/or higher shrink temperatures, but preferably without the environmental problems normally associated with mineral tannages. Another object is to reduce the total time taken to complete the various steps required to convert the skins to leather.

Unexpectedly it has now been discovered that the above objects can be achieved by using THP or its condensates in combination with mineral tannage. In particular the combination of THP or THP condensates with very small amounts of mineral tannage, especially a chrome, titanium or zirconium tannage, permits high shrink temperatures to be attained without serious effluent problems. We have further discovered, surprisingly, that combinations of THP or THP condensates and chrome tan, preferably with non-ionic amphoteric and/or cationic surfactants may be used in combined degreasing and tanning, without the formation of chrome soaps thereby eliminating at least one step in the process as a separate operation and substantially reducing tanning time. THP or its salts or condensates, and chrome show a marked synergism when used together.

In a first embodiment, the invention provides a synergistic tanning composition comprising an aqueous solution of (A) THP or a THP salt or a THP condensate and (B) a mineral tanning salt.

According to a second embodiment the invention provides a method of tanning which comprises applying to skins a synergistic tanning composition according to the first embodiment.

The mineral tanning agent is preferably a chromium, titanium or zirconium salt, e.g. basic chromium sulphate.

According to a third embodiment the invention provides a method of tanning which comprises applying to skins a synergistic tanning composition comprising (A) from 0.05 to 20% (based on the wet weight of skins) of THP or a THP salt or a THP condensate and (B) from 0.1 to 3% (based on the weight of the skins) of a mineral tannage, preferably a chromium, titanium or zirconium tannage.

According to a fourth embodiment our invention provides a method of tanning which comprises contacting substantially undegreased skins, optionally after acid pickling, with a synergistic tanning composition comprising THP or a THP salt or a THP condensate and basic chromium. sulphate and preferably also with a surfactant, especially a non-ionic and/or cationic surfactant.

According to a fifth embodiment our invention provides a synergistic tanning composition comprising an aqueous solution of (A) THP or a THP salt or a THP condensate and (B) a chromium tanning salt in a relative weight proportion of A:B of from 200:1 to 1:1, preferably 100:1 to 2:1, more preferably 50:1 to 5:1, e.g. 30:1 to 10:1.

The tannage of our invention preferably additionally contains non-ionic and/or cationic surfactants and/or syntans. According to a sixth embodiment therefore, our invention provides a synergistic tanning composition comprising (A) THP or a THP salt or a THP condensate, (B) basic chromium sulphate and (C) a syntan, a non-ionic surfactant and/or a cationic surfactant.

As used herein all % of mineral tannage are expressed as weight equivalent metal oxide (e.g. chromic oxide) based on total weight of wet skins where the context permits.

Normally chrome tans give problems with the formation of chrome soaps unless the skins have been thoroughly degreased prior to tanning. However when mixtures of chrome and the THP are applied, even to such heavily contaminated substrates as undegreased wool skins according to the present invention, the formation of chrome soaps does not present a problem. At the low levels of chrome addition which are preferred in this invention the effluent problems normally associated with chrome tanning are substantially reduced or avoided. We believe that the formation of chrome soaps way be at least partially prevented or the resulting soap solubilised by the THP.

For the purpose of this specification "syntan" is used to refer to synthetic organic compounds capable of reacting with collagen to form cross links or to modify the physical properties of the leather and also to auxiliary syntans which do not in themselves contribute substantially to the cross linking but which modify the physical properties of the leather. For example the term includes any water soluble polymer prepared by copolymerising formaldehyde, which is capable of increasing the shrink resistance of collagen and which comprises at least two units of the formula

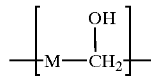

where each M is an aryl group such as a phenyl, naphthyl or aniline group substituted with one or more hydroxyl and/or sulphate, sulphone or sulphonimide groups or a urea or melamine residue. As used herein the term "syntan" also includes resin syntans which are homopolymers and copolymers of unsaturated carboxylic acids or their salts, esters, amides or nitrites, e.g. acrylic acid, methacrylic acid, acrylamide, acrylonitrile, maleic acid, fumaric acid, itaconic acid, aconitic acid, crotonic acid, isocrotonic acid, citraconic acid, mesaconic acid, angelic acid, tiglic acid and cinnamic acid. The copolymers may also comprise other vinylic comonomers such as styrene. Also included are acetone condensates with, for example sulphones and sulphonamides. Resin syntan may modify such properties as dye levelling, filling, grain appearance, break, grain strength, buffing nap, softness and tensile or tear strength. THP may be formed in situ from any THP salt by raising the pH. Preferably the pH is raised above 3.5, more preferably above 4, e.g. above 4.5. High pH is preferably avoided because it converts THP to THPO, which is substantially ineffective as a tanning agent. We prefer that THP solutions for use according to our invention should have a pH less than 10, more preferably less than 9, especially less than 8, typically less than 7.5, most preferably 4.5 to 7. We prefer that the THP contains less than 15%, more preferably less than 10%, e.g. less than 9% of THPO based on the weight thereof. Generally the less THPO present the better.

To minimise the oxidation of THP we prefer to avoid including substantial amounts of oxidising agents for THP in the THP-containing liquors before the latter have reacted with the collagen. It is preferred to include a buffer and/or a catalyst for the formation of THP. For example a mixture of magnesium salt such as magnesium sulphate with a water soluble carboxylate salt such as sodium formate, sodium acetate, potassium propionate or other water soluble alkali metal or ammonium salt of a carboxylic acid. We do not exclude the treatment of skins with oxidising agents such as hydrogen peroxide before or after tanning.

The THP salt is preferably the sulphate (THPS), but may also be the chloride (THPC) or phosphate (THPP). Other salts which could less preferably be used include the bromide, carbonate, acetate, citrate, formate lactate or borate. In principal, any water soluble THP salt with an anion which does not interact adversely with THP or other components of the tannage, or with the leather may be used. It is preferred that anions which are oxidising agents for THP should be substantially absent.

The THP condensate may preferably be a condensate of a THP salt and urea or THP salt with an alkyl amine, e.g. a $C_{1-20}$ alkylamine. Alternatively the THP salt may be condensed with thiourea, guanidine, ammonia, dicyandiamide, melamine or with a combination of comonomers. In the preparation of condensates, the THP salt is usually THPC or THPS, although any salt of a counterion which does not react adversely with other components of the system may be used. The THP condensate may be formed in situ by adding THP or a THP salt and e.g. ammonia, urea, melamine, guanidine or dicyandiamide or a salt thereof, to the tannage.

The total concentration of THP salt, THP and THP condensate present in the tanning liquor is preferably from 0.1 to 35% by weight based on the total weight of the tanning liquor, more preferably 0.5 to 25%, e.g. 1 to 10%, most preferably 1.5 to 5%. The total proportion of the THP and/or condensate used is from 0.05 to 20% by weight based on the weight of wet skin, preferably 0.5 to 10%, especially 0.75 to 5%, e.g. 1 to 3%. The mineral tannage is preferably added in a proportion of 0.2 to 8% based on the wet weight of skins, more preferably 0.3 to 7%, e.g. 0.4 to 3%.

In a preferred embodiment, we prefer that the tanned leather, optionally after one or more other tanning stages, is contacted with an acid, basic or direct dye.

When the THP or THP condensate is used in combination with a syntan, the latter is preferably a polyacrylate, polymethacrylate, or copolymer of acrylic and/or methacrylic acid with acrylonitrile and/or acrylamide. Typically the polymer has a molecular weight in the range 1,000 to 200,000, more usually 3,000 to 100,000. Alternatively the syntan may be or may comprise a copolymer of formaldehyde with a hydroxy substituted and/or sulphonated benzene, alkyl benzene, naphthalene or alkyl naphthalene such as for example, phenol, benzene sulphonic acid, cresol, toluene sulphonic acid, xylenol, naphthalene sulphonic acid, resorcinol or phenol sulphonic acid, or mixtures, thereof in the form of random or block copolymers. Particularly preferred is a poly condensation product of formaldehyde with dihydroxydiphenyl sulphone.

The syntan is preferably present at a concentration of from 0.5 to 35% by weight of the tanning liquor. e.g. 1 to 20%, more preferably 2 to 10% especially 3 to 6%. The total proportion of syntan used is preferably from 1 to 20% by weight based on the wet weight of skins, e.g. 2 to 10% especially 3 to 5%.

The mineral tannage is preferably basic chromic sulphate, but other basic chromium salts may be used as may alum or other aluminium tanning salts, zirconium salts, titanium salts and iron salts.

Surfactants for use in tannages of our invention typically contain hydrophobic groups such as alkenyl, cycloalkenyl, alkyl, cycloalkyl, aryl, alkyl/aryl or more complex aryl (as in petroleum sulphonates) moieties having from 8 to 22, preferably 10 to 20, typically 12 to 18 carbon atoms and a hydrophilic moiety. Other hydrophobic groups included in the invention are polysiloxane groups.

The surfactant may for example consist substantially of an at least sparingly water-soluble salt of sulphonic or mono esterified sulphuric acids, e.g. an alkylbenzene sulphonate, alkyl sulphate, alkyl ether sulphate, olefin sulphonate, alkane sulphonate, alkylphenol sulphate, alkylphenol ether sulphate, alkylethanolamide sulphate, alkylethanolamide-ther sulphate, or alpha sulpho fatty acid or its ester each having at least one alkyl or alkenyl group with from 8 to 22, more usually 10 to 20, aliphatic carbons atoms.

The expression "ether" hereinbefore refers to compounds containing one or more glyceryl groups and/or an oxyalkylene or polyoxyalkylene group especially a group containing from 1 to 20 oxyethylene and/or oxypropylene groups. One or more oxybutylene groups may additionally or alternatively be present. For example, the sulphonated or sulphated surfactant may be sodium dodecyl benzene sulphonate, potassium hexadecyl benzene sulphonate, sodium dodecyl dimethyl benzene sulphonate, sodium lauryl sulphate, sodium tallow sulphate, potassium oleyl sulphate, ammonium lauryl monoethoxy sulphate, or monoethanolamine cetyl 10 mole ethoxylate sulphate.

Other anionic surfactants useful according to the present invention include alkyl sulphosuccinates, such as sodium di-2-ethylhexylsulphosuccinate and sodium dihexylsulphosuccinate, alkyl ether sulphosuccinates, alkyl sulphosuccinanates, alkyl ether sulphosuccinamates, acyl sarcosinates, acyl taurides, isethionates, soaps such as stearates, palmitates, resinates, oleates, linoleates, and alkyl ether carboxylates. Anionic phosphate esters and alkyl phosphonates, alkyl amino and imino methylene phosphonates may also be used. In each case the anionic surfactant typically contains at least one aliphatic hydrocarbon chain having from 8 to 22, preferably 10 to 20 carbon atoms, and, in the case of ethers, one or more glyceryl and/or from 1 to 20 oxyethylene and/or oxypropylene and/or oxybutylene groups.

Preferred anionic surfactants are sodium salts. Other salts of commercial interest include those of potassium, lithium, calcium, magnesium, ammonium, monoethanolamine, diethanolamine, triethanolamine, alkyl amines containing up to seven aliphatic carbon atoms, and alkyl and/or hydroxyalkyl phosphonium.

The surfactant preferably contains or consists of nonionic surfactants. The nonionic surfactant preferably comprises a polyethoxylated alcohol, e.g. a $C_{10-14}$ alcohol with from 1 to 40, typically 2 to 20, especially 4 to 10, e.g. 5 to 8 ethoxy groups. Alternatively or additionally the non-ionic surfactant may comprise, e.g. a $C_{10-22}$ alkanolamide of a mono or di-lower alkanolamine, such as coconut monoethanolamide. Other nonionic surfactants which may optionally be present, include tertiary acetylenic glycols, polyethoxylated mercaptans, polyethoxylated carboxylic acids, polyethoxylated amines, polyethoxylated alkylolamides, polyethoxylated alkylphenols, polyethoxylated glyceryl esters, polyethoxylated sorbitan esters, polyethoxylated phosphate esters, and the propoxylated or ethoxylated and propoxylated analogues of all the aforesaid ethoxylated nonionics, all having a $C_{8-22}$ alkyl or alkenyl group and up to 20 ethyleneoxy and/or propyleneoxy groups. Also included are polyoxypropylene/polyethylene oxide copolymers, polyoxybutylene/polyoxyethylene copolymers and polyoxybutylene/polyoxypropylene copolymers. The polyethoxy, polyoxypropylene and polyoxybutylene compounds may be endcapped with, e.g. benzyl groups to reduce the foaming tendency.

Compositions of our invention may contain amphoteric surfactant.

The amphoteric surfactant may for example be a betaine, e.g. a betaine of the formula: $R_3N^+CH_2COO^-$, wherein each R is an alkyl, cycloalkyl, alkenyl or alkaryl group and preferably at least one, and most preferably not more than one R, has an average of from 8 to 20, e.g. 10 to 18 aliphatic carbon atoms and each other R has an average of from 1 to 4 carbon atoms. Particularly preferred are the quaternary imidazoline betaines of the formula:

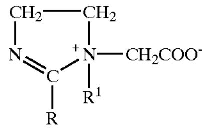

wherein R and R' are alkyl, alkenyl, cycloalkyl, alkaryl or alkanol groups having an average of from 1 to 20 aliphatic carbon atoms and R preferably has an average of from 8 to 20, e.g. 10 to 18 aliphatic carbon atoms and R' preferably has 1 to 4 carbon atoms. Other amphoteric surfactants for use according to our invention include alkyl amine ether sulphates, sulphobetaines and other quaternary amine or quaternised imidazoline sulphonic acids and their salts, and Zwitterionic surfactants, e.g. N-alkyl taurines, carboxylated amido amines such as $RCONH(CH_2)_2N^+(CH_2CH_2CH_3)_2CH_2CO^-_2$, and amino acids having, in each case, hydrocarbon groups capable of conferring surfactant properties (e.g. alkyl, cycloalkyl alkenyl or alkaryl groups having from 8 to 20 aliphatic carbon atoms). Typical examples include 2-tallow alkyl, 1-tallow amido alkyl, 1-carboxymethyl imidazoline and 2-coconut alkyl N-carboxymethyl 2 (hydroxyalkyl) imidazoline. Generally speaking any water soluble amphoteric or Zwitterionic surfactant compound which comprises a hydrophobic portion including $C_{8-20}$ alkyl or alkenyl group and a hydrophilic portion containing an amine or quaternary ammonium group and a carboxylate, sulphate or sulphonic acid group may be used in our invention.

Compositions of our invention preferably include cationic surfactants, which help to suppress the formation of chrome soaps. The cationic surfactant may for example be an alkylammonium salt having a total of at least 8, usually 10 to 30, e.g. 12 to 24 aliphatic carbon atoms, especially a tri or tetra-alkylammmonium salt. Typically alkylammonium surfactants for use according to our invention have one or at most two relatively long aliphatic chains per molecule (e.g. chains having an average of 8 to 20 carbon atoms each, usually 12 to 18 carbon atoms) and two or three relatively short chain alkyl groups having 1 to 4 carbon atoms each, e.g. methyl or ethyl groups, preferably methyl groups. Typical examples include dodecyl trimethyl ammonium salts. Benzalkonium salts having one 8 to 20 C alkyl group two 1 to 4 carbon alkyl groups and a benzyl group are also useful.

Another class of cationic surfactant useful according to our invention comprises N-alkyl pyridinium salts wherein the alkyl group has an average of from 8 to 22, preferably 10 to 20 carbon atoms. Other similarly alkylated heterocyclic salts, such as N-alkyl isoquinolinium salts, may also be used.

Alkylaryl dialkylammonium salts, having an average of from 10 to 30 aliphatic carbon atoms are useful, e.g. those in which the alkylaryl group is an alkyl benzene group having an average of from 8 to 22, preferably 10 to 20 carbon atoms and the other two alkyl groups usually have from 1 to 4 carbon atoms, e.g. methyl groups.

Other classes of cationic surfactant which are of use in our invention include alkyl imidazoline or quaternised imidazoline salts having at least one alkyl group in the molecule with an average of from 8 to 22 preferably 10 to 20 carbon atoms. Typical examples include alkyl methyl hydroxyethyl imidazolinium salts, alkyl benzyl hydroxyethyl imidazolinium salts, and 2 alkyl-1-alkylamidoethlyl imidazoline salts.

Another class of cationic surfactant for use according to our invention comprises the amido amines such as those formed by reacting a fatty acid having 2 to 22 carbon atoms or an ester, glyceride or similar amide forming derivative thereof, with a di or poly amine, such as, for example, ethylene diamine or diethylene triamine, in such a proportion as to leave at least one free amine group. Quaternised amido amines may similarly be employed.

Alkyl phosphonium and hydroxyalkyl phosphonium salts having one $C_{8-20}$ alkyl group and three $C_{1-4}$ alkyl or hydroxyalkyl groups may also be used as cationic surfactants in our invention.

Typically the cationic surfactant may be any water soluble compound having a positively ionised group, usually comprising a nitrogen atom, and either one or two alkyl groups each having an average of from 8 to 22 carbon atoms.

The anionic portion of the cationic surfactant may be any anion which confers water solubility, such as formate, acetate, lactate, tartrate, citrate, chloride, nitrate, sulphate or an alkylsulphate ion having up to 4 carbon atoms such as methosulphate. It is preferably not a surface active anion such as a higher alkyl sulphate or organic sulphonate.

Polyfluorinated anionic, nonionic or cationic surfactant may also be useful in the compositions of our invention. Examples of such surfactants are polyfluorinated alkyl sulphates and polyfluorinated quaternary ammonium compounds.

Compositions of our invention may contain a semi-polar surfactant such as an amine oxide, e.g. an amine oxide containing one or two (preferably one) $C_{8-22}$ alkyl group, the remaining substituent or substituents being preferably lower alkyl groups, e.g. $C_{1-4}$ alkyl groups or benzyl groups.

Particularly preferred for use according to our invention are surfactants which are effective as wetting agents, typically such surfactants are effective at lowering the surface tension between water and a hydrophobic solid surface. We prefer surfactants which do not stabilise foams to a substantial extent.

Mixtures of two or more of the foregoing surfactants may be used. In particular mixtures of non-ionic surfactants with cationic and/or amphoteric and/or semi polar surfactants or with anionic surfactants may be used. Typically we avoid mixtures of anionic and cationic surfactants, which are often less mutually compatible.

Preferably the total THP (including THP salts and condensates) and the surfactant are present in a relative weight concentration of from 1:1000 to 1000:1, more usually 1:50 to 200:1, typically 1:20 to 100:1, most preferably 1:10 to 50:1, e.g. 1:1 to 20:1 especially 2:1 to 15:1.

The tannage may additionally contain biocides, water dispersants, antifoams, solvents, scale inhibitors, corrosion inhibitors, chelating agents, fat liquors, fragrances, oxygen scavengers and/or flocculants.

Where a syntan is used, the proportion by weight of total THP, THP salt and THP condensate to syntan may typically be from 1:10 to 10:1, preferably 1:5 to 2:1, especially 1:2 to 1:1. The total proportion of tannages used is preferably from 4 to 20% active weight based on the wet weight of skins, e.g. 5 to 10%, especially 6 to 8%.

The THP is preferably applied in the substantial absence of monomers or prepolymers capable of being cross linked by THP such as phenol, urea, melamine or their precondensates with formaldehyde. For the purposes of this specification, "the substantial absence of monomers or prepolymers" means less than the minimum that would be capable of reacting or copolymerising with 50% of the THP, more preferably less than the minimum that would be required to react or copolymerise with 20%, e.g. less than 5% by weight based on the THP salt, most preferably less than 2%, especially less than 1%.

The THP or THP condensate is preferably applied in conjunction with the mineral tannage as a first tanning step optionally with a syntan or a mineral tannage as a retan. Preferably the THP is applied to delimed and acidified skins prior to aqueous degreasing. E.g. the initial pH is typically below 5, e.g. below 4. However it is also possible to apply the THP to alkaline skins without prior acidification or pickling. We prefer that the pH be raised or maintained above 5 and preferably maintained above 6 for the main duration of the tanning process.

The skins are preferably agitated in the tanning liquor for a sufficient time to raise the shrink temperature above 70° C., more preferably above 75° C. most preferably above 80° C., especially above 85° C. most especially above 90° C. Alternatively a concentrated tanning solution comprising the THP or THP condensate and the mineral tannage may be applied directly to the skins as a surface layer, e.g. by padding, painting, rollering or spraying.

In order to avoid a hard texture when THP is applied directly to the skin in this way it is strongly preferred to apply the THP in conjunction with fat liquor, and/or to apply fat liquor at, or immediately after, each tanning stage. Fat liquor is a water based emulsion of aliphatic oils or fats, including animal, vegetable, mineral or synthetic, aliphatic oils or fats normally applied to leather after tanning in order to lubricate it and replace the natural oils which the skins lose during the tannery processes. Our invention according to a preferred embodiment provides a combined tanning and fat liquoring composition for application to leather comprising an aqueous phase containing at least 10% by weight total of the THP and chrome based on the weight of the composition, from 10 to 50% based on the weight of the composition of an aliphatic oil or fat phase and sufficient surfactant to emulsify the oil or fat phase in the aqueous phase.

The oil phase may be a glyceride oil or fat including vegetable oils, fish oils and/or animal oils or fats, a fatty ester and/or a mineral oil. The total amount of oil may be from 2 to 30% by weight based on the weight of skins, preferably 5 to 20%.

The invention is illustrated by the following examples in which all percentages, unless otherwise stated, are by weight based on the wet weight of skins (that is the weight of skins which have been thoroughly wetted and drained but not dried).

EXAMPLE 1

The following tanning sequence was employed to tan pickled sheepskins in rotary drums.

| OPERATION | PRODUCT | % | ° C. | MIN | pH |
|---|---|---|---|---|---|
| Pretannage | Water | 100.00 | 30 | | |
| | Sodium Chloride | 6.00 | | | |
| | "IMMEGAN" A | 1.00 | | | |
| | "KL7" | 5.00 | | 5 | |
| Add skins | | | | | |
| | Chrome Powder 25% | 1.00 | | 30 | |
| | "AD75M" | 1.00 | | 30 | |
| Check | | | | | 1.75 |
| | Sodium Formate | 1.00 | | 45 | |
| | Sodium Bicarbonate | 1.00 | | 45 | 3.03 |
| | Sodium Bicarbonate | 1.00 | | 45 | 3.60 |
| | Sodium Bicarbonate | 1.00 | | 45 | 4.25 |
| Check & Drain | | | | | 5.60 |
| Washes 5x | Water | 200.00 | 45 | 10 | |
| Drain | | | | | |
| Preservative | Water | 100.00 | 30 | | |
| | "TOLCIDE" 2300 | 0.20 | | 20 | |

"IMMEGAN" is a Registered Trade Mark. "KCL7" refers to a $C_{12-14}$ alkyl 7 mole ethoxylate sold by Albright & Wilson under the Registered Trade Mark "EMPILAN" KCL7. "AD75M" refers to a solution containing 75% by weight based on the weight of the total solution of THPS sold by Albright & Wilson under the Registered Trade Mark "ALBRITE" AD75M. "TOLCIDE" is a Registered Trade Mark of Albright & Wilson.

The leather had a final shrink temperature of 80° C. with an area yield of 100% based on the area of the untanned skins. Despite the good area yield the leather had a tight quality typical of THP tannages. In comparison when the process was repeated without chrome addition the final shrink temperature was 64° C. This was raised to 65° C. after a further 45 minutes rotation in the drum prior to rinsing. The area yield was only 90%.

The total tanning time was reduced to 4½ hours compared to 7 to 9 hours for a conventional chrome taming sequence. Effluent problems were substantially reduced.

EXAMPLE 2

| OPERATION | PRODUCT | % | g | ° C. | MIN | pH | TIME | COMMENTS |
|---|---|---|---|---|---|---|---|---|
| Pretannage | Water | 100.00 | 3226 | 30 | | | | |
| | Salt | 8.00 | 266 | | | | | |
| | Sodium Formate | 0.75 | 24.7 | | | | | |
| | KCL 7 | 5.00 | 166 | | 5 | | | |
| Add Skins | | | | | 15 | | 8.47 | pH 3.25 set back with 0.5% FA |
| | Chrome 25% | 1.00 | 33.3 | | 30 | 2.89 | 10.30 | |
| | AD75M | 1.00 | 33.3 | | 30 | | 11.00 | |
| | Sodium Formate | 0.75 | 24.9 | | 45 | | 11.30 | |
| | Sodium Bicarbonate | 1.00 | 33.3 | | 45 | | 12.05 | |
| | Sodium Bicarbonate | 1.00 | 33.3 | | 45 | 3.47 | 13.00 | |
| | Sodium Bicarbonate | 0.80 | 26.6 | | 45 | 4.01 | 13.45 | |
| | Sodium Bicarbonate | 0.50 | 16.7 | | 30 | 4.56 | 15.00 | Ts = 87° C. |
| Check | | | | | | | 15.35 | |
| Drain | | | | | | | | |
| Washes 5× | Water | 200.00 | | 45 | 10 | | | |
| Drain | | | | | | | | |
| Fungicide | Water | 100.00 | | 30 | | | | |
| | Tolcide 2300 | 0.20 | | | 20 | | | |
| Drain & Rinse | | | | | | | | |

EXAMPLE 3

| OPERATION | PRODUCT | % | g | ° C. | MIN | pH | TIME | COMMENTS |
|---|---|---|---|---|---|---|---|---|
| Pretannage | Water | 100.00 | 5126 | 30 | | | | |
| | Salt | 8.00 | 410 | | | | | |
| | Sodium Formate | 0.50 | 2.6 | | | | | |
| | KCL 7 | 5.00 | 256 | | 5 | | | |
| Add Skins | | | | | | 1.91 | 8.47 | |
| | AD75M | 1.00 | 51.3 | | | | | |
| | Chrome 25% | 1.00 | 51.3 | | 60 | | 9.00 | |
| | Sodium Formate | 1.00 | 51.3 | | 45 | | | |
| | Sodium Bicarbonate | 1.00 | 51.3 | | 45 | 3.08 | 11.10 | |
| | Sodium Bicarbonate | 1.00 | 51.3 | | 45 | 3.67 | 12.10 | |
| | Sodium Bicarbonate | 0.60 | 30.8 | | 45 | 4.28 | 13.15 | |
| Check & Drain | | | | | | 5.06 | 14.15 | Ts = 86° C. |
| Degrease | Water | 200.00 | | 35 | | | | |
| | Sandoclean MW | 5.00 | | 45 | O/N | | | |
| Drain | | | | | | | | |
| Washes 4× | Water | 200.00 | | 45 | 10 | | | |
| Drain | | | | | | | | |
| Fungicide | Water | 100.00 | | 30 | | | | |
| | Tolcide 2300 | 0.20 | | | 20 | | | |
| Drain & Rinse | | | | | | | | |

Examples 2 and 3 each provided a tight flat leather with an area yield of 100% based on the area of the untreated skins.

EXAMPLE 4

24 pickled sheep skins were treated with a sequence substantially identical to that of Example 3 including the addition of 1% chrome and 0.75% active THP according to the invention, up to the last bicarbonate addition, and then retanned with a second addition of 3% by weight of wet skins, of chrome.

For comparison a further batch of 24 skins were treated in an identical sequence but with the first chrome addition omitted.

In the sequence according to the invention no skin recorded a yield of less than 100 and the average yield was 109.24. In the comparative example only three skins recorded a yield over 100, the majority were under 95 and the average yield was 93.15.

What is claimed is:

1. A synergistic tanning composition comprising, in aqueous solution, (A) a phosphorus compound selected from the group consisting of tris(hydroxymethyl) phosphine (THP), tetrakis(hydroxymethyl) phosphonium salts (THP salts) and THP condensates, and (B) a mineral tanning salt, wherein said mineral tanning salt (B) is a chromium tanning salt and the weight ratio of (A):(B) is from 200:1 to 1:1.

2. A composition according to claim 1 wherein (B) is selected from the group consisting of chromium salts, titanium salts and zirconium salts.

3. A composition according to claim 1 wherein the weight ratio of (A):(B) is from 50:1 to 5:1.

4. A composition according to claim 1 wherein said composition additionally contains (C) at least one additive selected from the group consisting of syntans, non-ionic surfactants and cationic surfactants.

5. A composition according to claim 4 wherein (C) is a surfactant selected from the group consisting of non-ionic surfactants and cationic surfactants and the weight proportion of A) to (C) is from 1:50 to 200:1.

6. A composition according to claims 4 wherein (C) is a syntan and the weight proportion of (A) to (C) is from 1:10 to 10:1.

7. A composition according to claim 1 wherein said composition contains from 0.1 to 35% by weight of (A) and (A) comprises at least one compound selected from the group consisting of THP and THP condensates.

8. A method of tanning which comprises applying to skins a synergistic tanning composition according to claim 4.

9. A method according to claim 8 wherein, in said composition, (A) is selected from the group consisting of THP and THP salts, (B) is basic chromium sulphate and (C) is a surfactant, said composition being applied to substantially undegreased skins.

10. A method of tanning which comprises applying to skins a synergistic tanning composition according to claim 4, wherein said composition comprises from 0.05 to 20% by weight of (A) based on the wet weight of the skins; and from 0.1 to 3% by weight of (B) expressed as weight of metal oxide based on the wet weight of skins.

11. A method according to claim 10 wherein, in said composition, (A) is selected from the group consisting of THP and THP salts, (B) is basic chromium sulphate and (C) is a surfactant, said composition being applied to substantially undegreased skins.

12. A method according to claim 11 wherein said surfactant (C) is a non-ionic surfactant.

13. A method according to claim 11 wherein said surfactant (C) is a cationic surfactant.

* * * * *